United States Patent
Wang et al.

(10) Patent No.: US 7,158,571 B2
(45) Date of Patent: Jan. 2, 2007

(54) SYSTEM AND METHOD FOR BALANCING VIDEO ENCODING TASKS BETWEEN MULTIPLE PROCESSORS

(75) Inventors: Jason Naxin Wang, San Jose, CA (US); Masahito Yamane, Kanagawa (JP); Ikuo Tsukagoshi, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 590 days.

(21) Appl. No.: 10/020,655

(22) Filed: Dec. 11, 2001

(65) Prior Publication Data

US 2002/0101930 A1    Aug. 1, 2002

Related U.S. Application Data

(60) Provisional application No. 60/254,825, filed on Dec. 11, 2000.

(51) Int. Cl.
  *H04B 1/66* (2006.01)
  *H04N 7/12* (2006.01)

(52) U.S. Cl. ................................. 375/240.23

(58) Field of Classification Search ........... 375/240.02, 375/240.03, 240.04, 240.05, 240.12, 240.16, 375/240.11, 240.23, 240.17; 348/699, 700, 348/406.1, 401.1; 382/248; 712/1; 708/203; *H04N 1/66, H04N 7/36; H04B 7/12*
See application file for complete search history.

(56) References Cited

U.S. PATENT DOCUMENTS 5,367,629 A * 11/1994 Chu et al. ................... 382/253
5,644,306 A * 7/1997 Brent ........................... 341/67
5,706,216 A * 1/1998 Reisch ........................ 708/203
5,781,788 A * 7/1998 Woo et al. ...................... 712/1
6,064,450 A * 5/2000 Canfield et al. ....... 375/240.29
6,229,850 B1 * 5/2001 Linzer et al. .......... 375/240.11
6,317,460 B1 * 11/2001 Lee ........................ 375/240.16
6,496,607 B1 * 12/2002 Krishnamurthy et al. ... 382/282
6,546,145 B1 * 4/2003 Miyake et al. .............. 382/248

FOREIGN PATENT DOCUMENTS

EP       000782341 A2 *   7/1997

* cited by examiner

*Primary Examiner*—Tung Vo
(74) *Attorney, Agent, or Firm*—Blakely, Sokoloff, Taylor & Zafman LLP

(57) ABSTRACT

System and method for balancing video encoding tasks between multiple processors. The method may include receiving a real time video stream, performing picture level and upper processing on a main processor, executing a macroblock loop in parallel on a main processor and a co-processor, wherein executing includes processing a first group of video encoding tasks on the main processor and processing a second group of video encoding tasks on the co-processor, and outputting an encoded version of the real time broadcast. The method may be implemented on a system that includes a main processor, a co-processor, and an interface to receive the real time video stream, each coupled to one or more buses. The encoding may be performed according to the well known Moving Pictures Experts Group (MPEG) standards.

36 Claims, 7 Drawing Sheets

SYSTEM AND METHOD FOR BALANCING VIDEO ENCODING TASKS BETWEEN MULTIPLE PROCESSORS

RELATED APPLICATION

This application claims the benefit of U.S. Provisional Application No. 60/254,825 filed Dec. 11, 2000.

FIELD OF THE INVENTION

The invention relates generally to encoding digital video, and more specifically, to encoding digital video according to the Moving Pictures Expert Group (MPEG) standard.

BACKGROUND

Video compression is becoming a requirement of many electronic devices. Video compression is an important component in devices such as personal computers, digital cameras, digital video cameras or camcorders, and personal video recorders (PVRs), also known as digital video recorders. To better understand how an why compression is becoming more commonplace, review of the history of how consumers view and use television signals is instructive.

Historically, television signals were broadcast from a transmitter and received and displayed immediately upon receipt on a television receiver. As television evolved, cable television became widespread. However, with the advent of cable television, viewers still watched television shows as they were broadcast. With the introduction of the video cassette recorder (VCR), television viewers were able to record television broadcasts to be viewed at a time after the original broadcast of the particular television program. This provided television viewers a greater freedom to enjoy the television broadcasts at their convenience.

Relatively recently, PVRs had been made available to consumers. PVRs including the functionality provided by TiVo, Inc. of Alviso, Calif., and Replay TV/Sonicblue, Inc. of Santa Clara, Calif., now allow the television viewer even more options as to how and when a television program or other video content will be viewed. Among other things, PVRs allow a television viewer to pause a live broadcast of a program while, for example, answering the telephone or attending to some task in the viewer's home. In addition, PVRs may include technology which records specific programs selected by a viewer from a program guide and may also include smart technology which automatically records programs meeting criteria selected by a viewer while the viewer is not available or not watching television. Generally, a PVR must receive a television broadcast and store it in a format which later will be displayed to the television viewer. Such storage must also occur in real time while the viewing of a currently live broadcast program is paused. To efficiently store broadcast programs, programs are compressed prior to storage. Similarly, other personal electronic devices compress sequences of real time images before storing them as video.

DETAILED DESCRIPTION

Personal video recorders (PVRs) receive television broadcasts in one format and encode the television broadcasts in real time in a second format for storage on a hard disk drive or other storage device within the PVR. The broadcast material may be encoded according to the well known Moving Picture Expert Group (MPEG) standards before it is stored on the hard disk drive. The MPEG family of standards is entitled "Coding of Moving Pictures and Audio" and is a set of evolving standards, including MPEG-1, MPEG-2, MPEG-4, MPEG-7 and MPEG-21. The MPEG-1, MPEG-2 and MPEG-4 standards are available from the International Organization for Standardization of Geneva, Switzerland as International Standards Organization/International Electrotechnical Commission (ISO/IEC) 11172, ISO/IEC 13818, and ISO/IEC 14496, respectively. Similarly, the material stored on the storage device must be processed, including unencoding, when the stored broadcast material is retrieved for display to a viewer. It is the real time encoding required of a PVR that the systems and methods described herein address. In addition, the methods described herein may be incorporated into any devices that require real time video compression, including, for example, digital cameras, digital video recorders or camcorders, digital versatile disk (DVD) recorders, compact disk (CD) recorders, personal computers, and the like.

Figure 1:
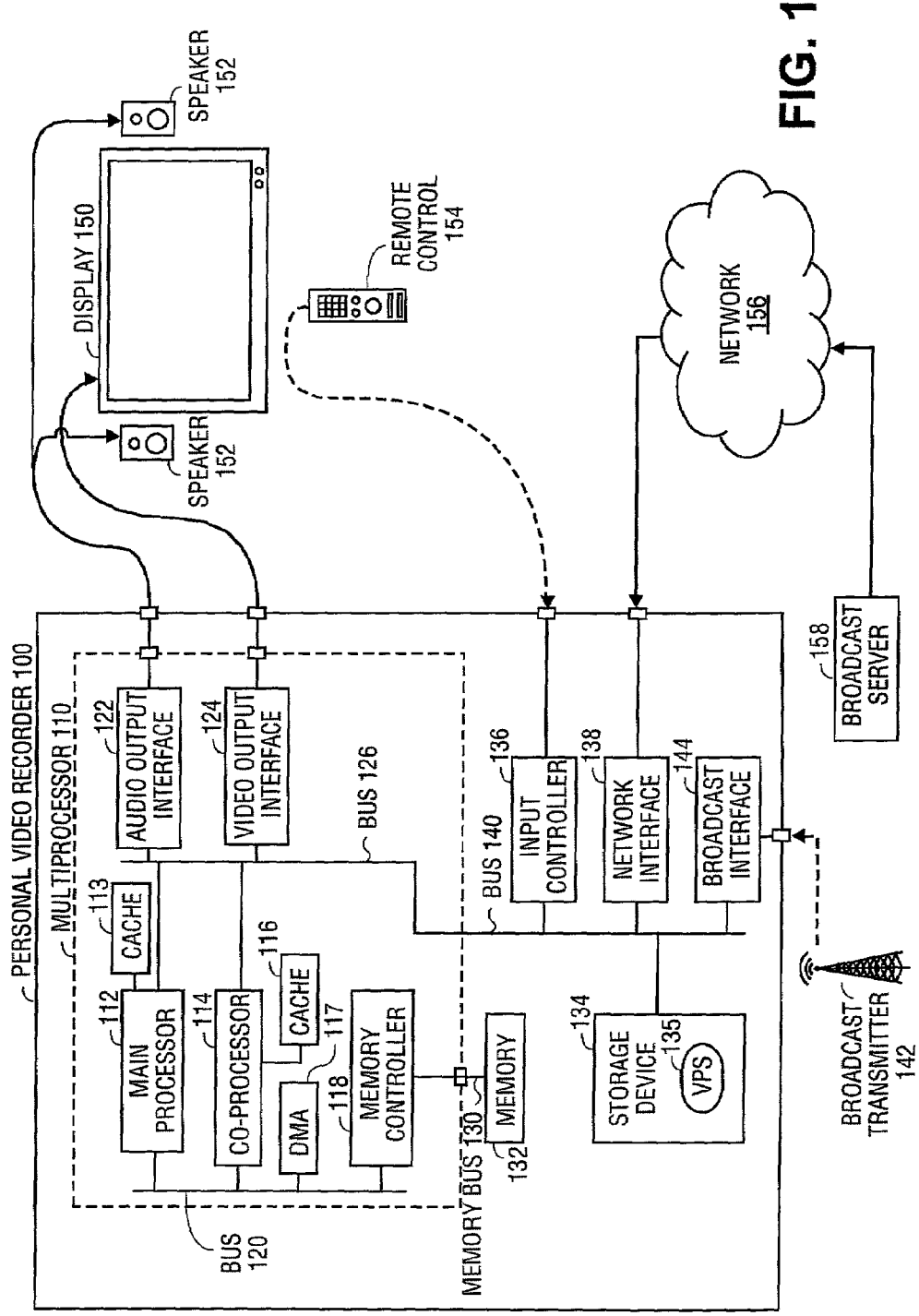
FIG. 1 illustrates an environment in which one embodiment of the invention executes.

FIG. 1 illustrates an environment in which one embodiment of the invention executes. In one embodiment, personal video recorder (PVR) 100 receives a real time video stream as a television broadcast stream from a hardwired connection such as network 156. In this embodiment, the real time video stream may originate from broadcast server 158. In one embodiment, network 156 may be the Internet or other widely accessible wide area network (WAN). Similarly, PVR 100 may receive a real time video stream as a television broadcast signal that originated from a television broadcast transmitter or other wireless communication device, such as broadcast transmitter 142. PVR 100 may store broadcast material from the broadcast stream and/or broadcast signal on a storage device, such as storage device 134 for later broadcast to a user via a display or television monitor such as display 150.

In one embodiment, the personal video recorder may include multiprocessor 110, storage device 134, input controller 136, and network interface 138 coupled for communication with each other via bus 140. In addition, memory 132 may be coupled directly to multiprocessor 110 via memory bus 130. In one embodiment, memory 132 may be any form of random access memory (RAM). In one embodiment, input controller 136 may receive user input from a remote control device such as remote control 154. Network interface 138 may be a cable modem or other device which allows for the receipt of broadcast communications in any of a variety of formats according to any of a variety of well known broadcast standards, including digital broadcast, analog broadcast, and other standards. That is, network interface 138 may allow for the receipt of broadcast material via a hardwired connection and/or wirelessly in a format promulgated by the International Telecommunications Union (ITU), the Advanced Television Systems Committee (ATSC), digital television (DTV), the Moving Pictures Expert Group (MPEG), high definition television (HDTV), and other well known formats. In various embodiments, the network interface may be coupled to a hardwired network such as a cable television network or a digital subscriber line (DSL) network, an Ethernet network, a twisted pair network, a fiber optic network such as a synchronous optical network (SONET) or other physically present connection. Similarly, broadcast interface 144 may allow for the receipt of a wireless broadcast in the form of microwave, satellite, radio wave, and the like from broadcast transmitter 142. In another embodiment, two or more network interfaces and/or broadcast interfaces may be included so that two or more kinds of broadcast signals and broadcast streams may be received by PVR 100 over two or more broadcast media including the hardwired networks and wireless broadcasts discussed herein.

In one embodiment, storage device 134 is a hard disk drive. In other embodiments storage device 134 may be any machine readable medium including magnetic disk drives such as hard disks, optical disk drives such as readable and writeable digital versatile disks (DVD-RWs), magnetic tape, semiconductor devices such as electronically erasable programmable read only memory (EEPROM) devices and flash memory devices, etc. Although only one storage device is depicted, PVR 100 may have two or more storage devices. In another embodiment, an external storage device may be coupled to PVR 100. In one embodiment, broadcast material such as television programs, movies, video games, raw data, music, audio, and anything that may be broadcast and received via network interface 138 and/or broadcast interface 140 may be stored on the storage device. In one embodiment, the broadcast material in the form of a television, HDTV or other similar broadcast may be digitally processed and encoded in real time before it is stored on storage device 134. It is multiprocessor 110 that processes and encodes the broadcast material for storage. In one embodiment, the storage device may include instructions which direct and control how multiprocessor 110 will process and encode the broadcast material. In one embodiment, the methods described herein may be implemented in software and stored on storage device 134 as video processing software (VPS) 135.

In one embodiment, multiprocessor 110 may include a variety of components including main processor 112 and co-processor 114. Main processor 112 may have its own private cache memory such as cache 113, and co-processor 114 may have a private cache memory such as cache 116. In one embodiment, main processor 112 may be considered a core processor having a very long instruction word (VLIW), and co-processor 114 may be considered a variable length encoding/decoding (VLx) processor. In one embodiment, the main processor may have a VLIW word size of 64 bits.

Also included in multiprocessor 110 is memory controller 118 which allows for transmission of data to and from memory 132 via memory bus 130. In various embodiments, memory controller 118 may be used by a direct memory access (DMA) controller, such as DMA controller 117, to access memory external to the multiprocessor. DMA is a programmable device that controls the automatic data transfer between any two memory blocks. Multiprocessor 110 may also include audio output interface 122 and video output interface 124, which allow for the broadcast of video signals and associated data from personal video recorder 100 to display 150 and associated speakers 152. Main processor 112, co-processor 114, audio output interface 122 and video output interface 124 may be coupled for communication with one anther via bus 126. It is via bus 126 that multiprocessor 110 communicates with other components of the personal video recorder via bus 140. In one embodiment, multiprocessor 110 may be a media processor such as the media accelerated processor for consumer appliances (MAP-CA) device available from Equator Technologies, Inc. of Campbell, Calif. and may be the TriMedia TM32 system on a chip available from TriMedia Technologies, Inc. of Milpitas, Calif. In another embodiment, each of the components within multiprocessor 110 may be separately and individually included in PVR 100. In this embodiment, one or more buses may be included in the PVR.

Although shown as implemented in PVR 100, the methods described herein may be implemented in any device requiring real time video encoding, including, for example, digital cameras, digital video recorder or camcorders, DVD recorders, CD recorders, personal computers, and the like.

Figure 2:
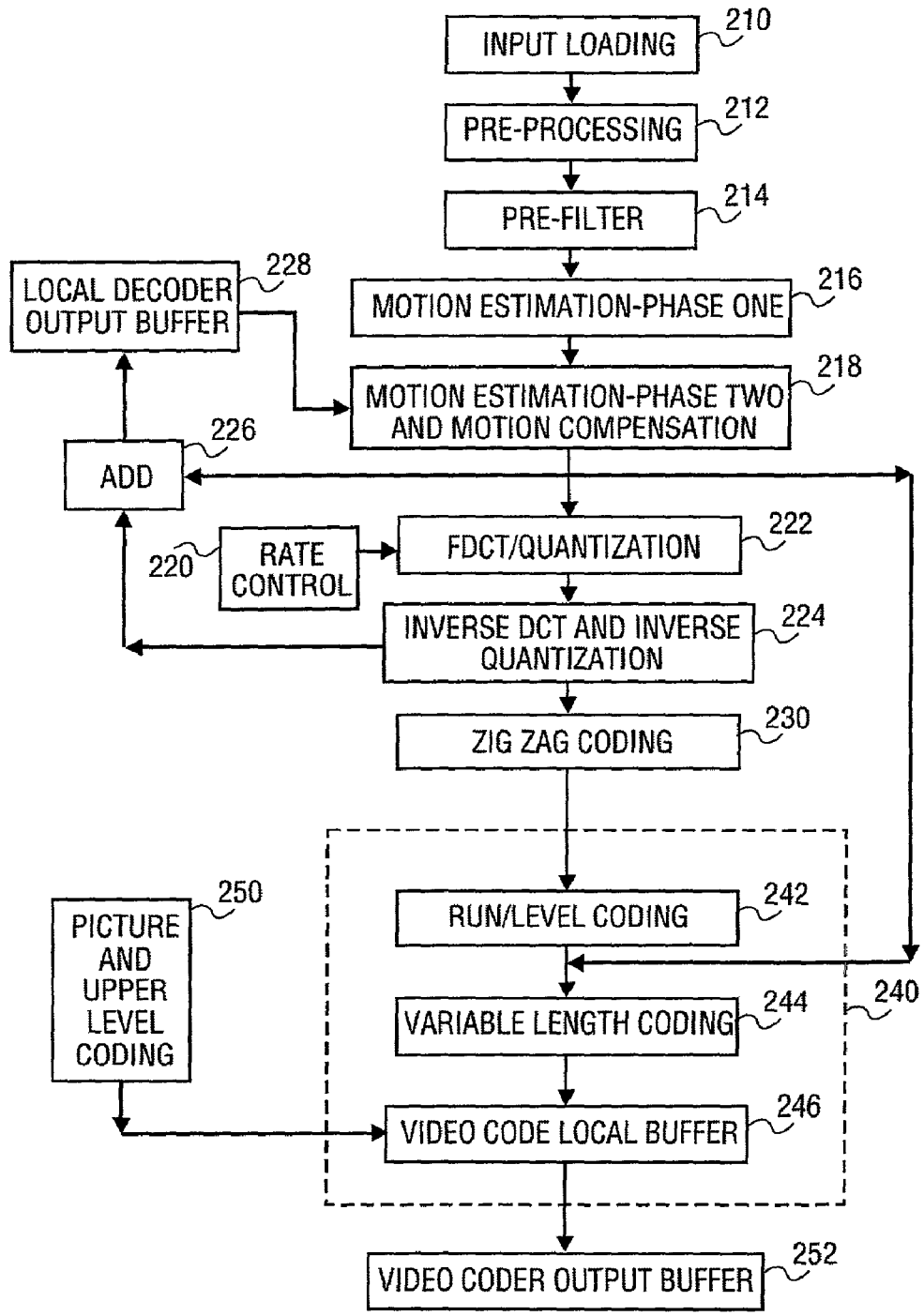
FIG. 2 illustrates a flow of actions taken according to an embodiment of the invention described herein.

FIG. 2 illustrates a flow of actions taken according to an embodiment of the invention described herein. In one embodiment, to take advantage of a multiprocessor that includes a main processor and a co-processor, the tasks included in encoding a video signal as a digital video file for later retrieval and viewing may be efficiently allocated between the main processor and the co-processor. In one embodiment, this encoding is accomplished according to the MPEG-2 standard. Much of the terminology used herein is well known in the art and is included in the MPEG-2 standard. The tasks involved in video encoding include input loading, as shown in block 210. After the data has been input and loaded, preprocessing and prefiltering are performed, as shown in blocks 212 and 214. Motion estimation may then be performed. In one embodiment, motion estimation may be broken down into two phases, Phase 1 and Phase 2, as shown in blocks 216 and 218. In one embodiment, motion estimation Phase 1 includes top to top and bottom to bottom searching, and motion estimation Phase 2 includes top to bottom and bottom to top searching, as well as a final estimation decision. Motion estimation Phase 2 may be combined with motion compensation, as shown in block 218. The output of motion estimation phase two includes motion vectors. Forward discrete cosine transform (FDCT) and quantization are then performed, as shown in block 222. The output of block 222 is a quantized two-dimensional 8×8 discrete cosine transform (DCT) matrix resulting from the FDCT. The inverse discrete cosine transform and the inverse quantization are then computed, as shown in block 224. The result of the inverse discrete cosine transform and inverse quantization computed in block 224 are added to the result of the motion compensation performed in block 218, as shown in block 226. The result of this addition is saved into local decoder output buffer 228. The data in local decoder output buffer 228 is used as reference data by motion estimation Phase 2 in block 218 for processing other frames.

This amounts to a feedback loop well known in this kind of processing. Zig zag coding is then performed in block 230. Zig zag coding converts the two-dimensional 8×8 DCT coefficients matrix into a one-dimensional array of 64 coefficients. Run and level coding is then performed in block 242. Run and level coding converts the one-dimensional array of 64 coefficients into a set of non-zero coefficients separated by some zero coefficients. The set of non-zero coefficients is called level and the number of zeros between each non-zero coefficients is called run. Each run/level pair and motion vectors from block 218 are encoded by variable length coding performed in block 244. Video code is stored in video code local buffer 246. The stored video code results from the variable length coding of block 244, and the picture and upper level coding of block 250. The three steps of (1) run level coding, (2) variable length coding, and (3) copying the video code into the video code local buffer may be thought of as a group as variable length encoding, as shown in block 240. The result is then copied into video coder output buffer 252. To achieve increased performance of encoding video signals as a digital file according to the MPEG standard, the variable length encoding tasks may be allocated to a specialized co-processor and performed in parallel while the remainder of the tasks involved in encoding are performed on a main processor. It is this parallel processing that provides increased efficiency and throughput when encoding video to be stored as digital video in a PVR or other device according to the methods described herein.

Figure 3:
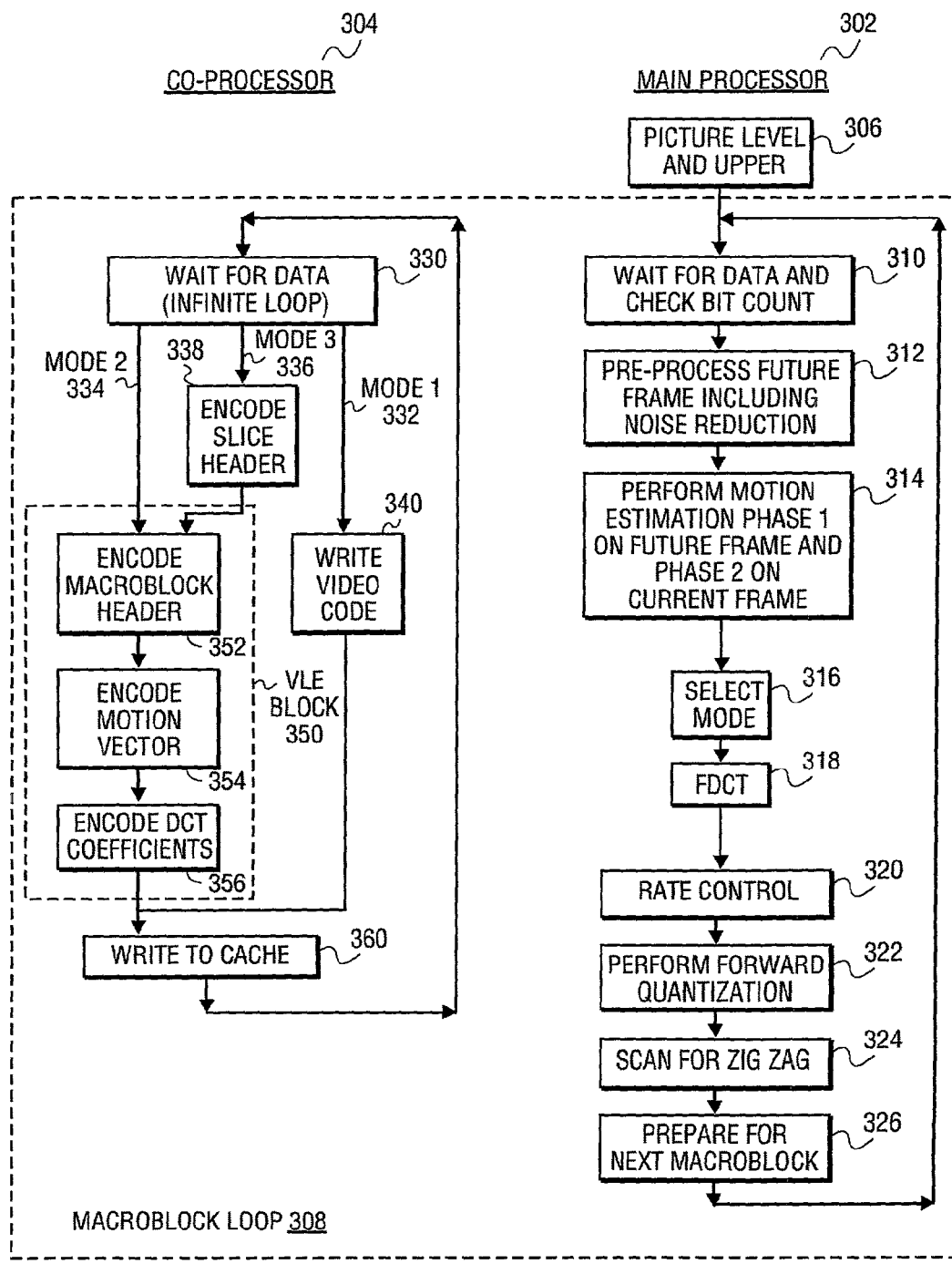
FIG. 3 illustrates the flow of execution of tasks in video encoding allocated between a co-processor and a main processor according to one embodiment of the invention described herein.

FIG. 3 illustrates the flow of execution of tasks in video encoding allocated between a co-processor and a main processor according to one embodiment of the invention described herein. Main processor 302 first performs picture level and upper processing as shown in block 306. At that point what will be referred to as macroblock loop 308 is entered. During macroblock loop 308 both co-processor 304 and main processor 302 execute in concurrent, co-executing infinite loops. Main processor 302 waits for the co-processor to finish the previous macroblock and for the DMA to transfer data into the local cache of the main processor and then checks the bit count of the data encoded by the co-processor, as shown in block 310. As is well known, according to the MPEG-2 standard, the bit count of one macroblock may not exceed a standard specified maximum number of bits. In one format, the standard specified maximum is 4,608 bits. However, the standard also specifies an exception such that a maximum of two macroblocks in each horizontal row of macroblocks may exceed this limitation. Preprocessing of the future frame, including noise reduction is achieved in block 312. The main processor then performs motion estimation Phase 1 on a future frame and motion estimation Phase 2 on a current frame, as shown in block 314. Then, the applicable mode is selected, as shown in block 316. The mode will determine if the current macroblock is coded as intra mode or inter mode. In intra mode, a forward discrete cosine transform (FDCT) will be applied to the original pixels. In inter mode, FDCT will be applied to the residual pixels after motion compensation. A FDCT is then executed, as shown in block 318. Rate control is then performed in block 320. The main processor then performs forward quantization in block 322. Scanning for zig zags is performed in block 324. The main processor then prepares for processing the next macroblock, as shown in block 326. Such preparations may include, in one embodiment, setting up the appropriate memory descriptors of the next macroblock which will be used by the DMA controller. The flow of execution then loops back to block 310.

In co-processor 304, execution begins with waiting for data in an infinite loop, as shown in block 330. Then, depending on the mode, execution continues. In one embodiment, there are three possible modes of execution. Mode 1, shown as reference number 332 is a bypass mode in which no variable length encoding preformed. The co-processor bypasses the variable length encoding block 350. The main processor may use this mode to send coded picture level and upper data to the video code buffer in the main memory. As such, when Mode 1 has been selected, execution proceeds from block 330 to block 340 where the video code is written. Execution will then continue at block 360 at which time the currently processed data is written to the co-processor's cache, and execution resumes at block 330. In Mode 2, shown as reference number 334, normal variable length encoding is achieved and this may be considered normal mode. As such, in Mode 2, VLE block 350 is executed. That is, after block 330, when in Mode 2, the macroblock header is encoded, as shown in block 352, the motion vector is encoded, as shown in block 354, and discrete cosine transform (DCT) coefficients are encoded, as shown in block 356. The processing of blocks 352, 354 and 356 are considered variable length encoding and may be thought of as VLE block 350. Upon completion of VLE block 350, the results are written to the co-processor cache, as shown in block 360. The flow of execution then continues at block 330. If when in block 330 the co-processor determines that the main processor has selected Mode 3, shown as reference number 336, execution continues at block 338. Mode 3 may be referred to as the encode slice header code and macroblock mode. In this mode, the co-processor generates a slice header on top of an encoded macroblock. That is, the co-processor encodes the slice header, as shown in block 338. Execution will then continue in the VLE block 350 and its constituent blocks as discussed above.

Figure 4:
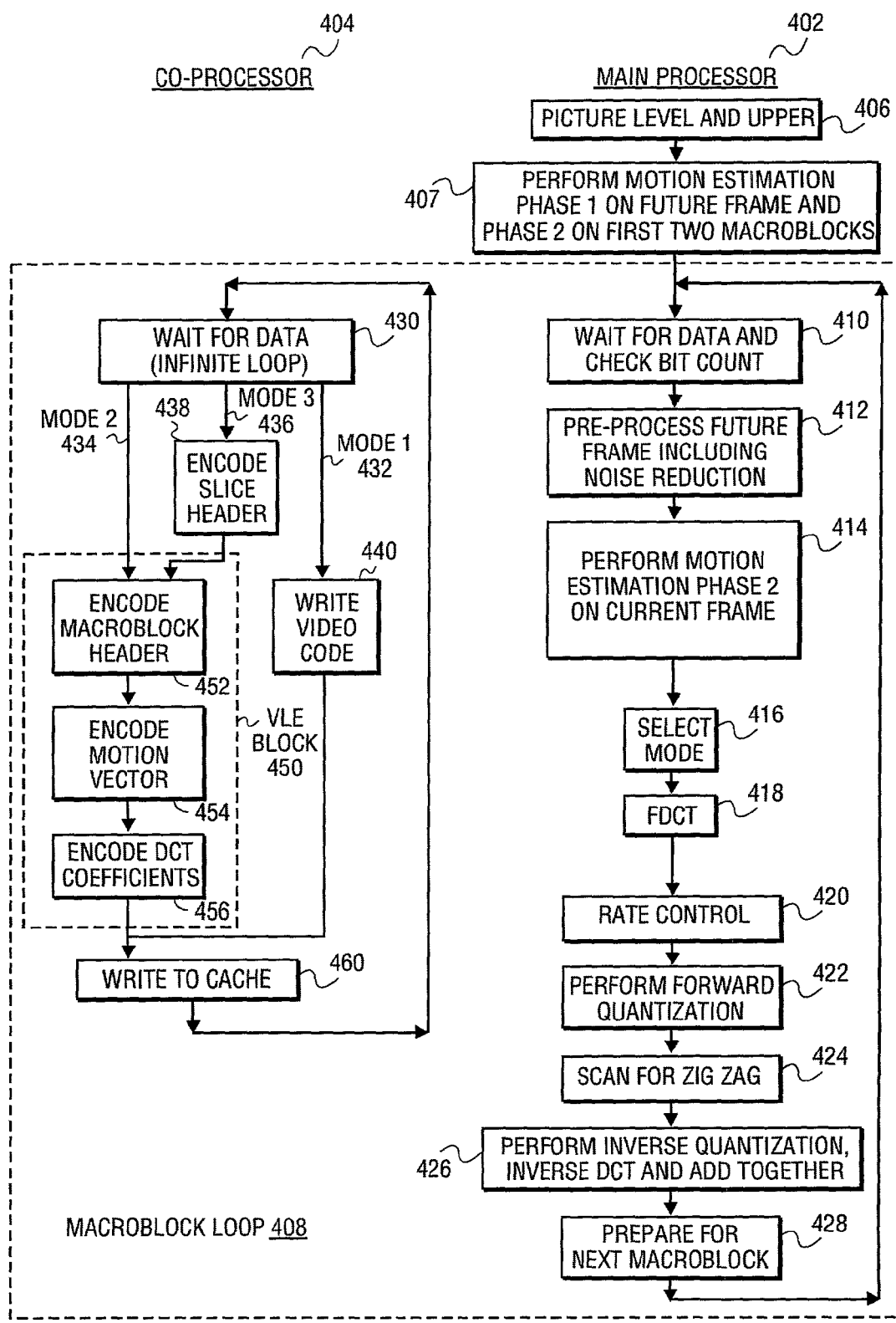
FIG. 4 illustrates the flow of execution of tasks in video encoding allocated between a main processor and a co-processor according to one embodiment of the invention described herein.

FIG. 4 illustrates the flow of execution of tasks in video encoding allocated between a main processor and a co-processor according to one embodiment of the invention described herein. In this embodiment, various tasks involved with video encoding may be moved out of the macroblock to increase throughput and efficiency when encoding digital video by freeing up motion estimation Phase 1 local memory cache while the main processor runs the macroblock encoding loop. The methods described herein may be used when the local cache of the main processor is not sufficiently large enough to handle the memory requirements of estimation Phase 1. The disadvantage of this configuration is that the co-processor stays idle when main processor is working on motion estimation Phase 1. As such, the available execution time of the co-processor is reduced. In this embodiment, main processor 402 first performs picture level and upper processing in block 406 and then performs motion estimation Phase 1 on a future frame and motion estimation Phase 2 on the first two macroblocks, as shown in block 407 before proceeding with the macroblock look 408. After processing, according to blocks 406 and 407, main processor 402 continues at block 410. Concurrently, co-processor 404 will begin processing at block 430. Co-processor 404 sits idle while blocks 406 and 407 are being executed on main processor 402. Co-processor 404 waits for data from the main processor, as shown in block 430.

In macroblock loop 408, main processor 402 waits for the co-processor to finish processing the previous macroblock and for the DMA to transfer data into the local cache of the main processor and then checks the bit count of the data encoded by the co-processor, as shown in block 410. Main processor 402 preprocesses one macroblock of a future frame including performing noise reduction, as shown in block 412. The main processor then performs motion estimation Phase 2 on the current frame, as shown in block 414. The main processor then selects the particular mode, as shown in block 416. A forward discrete cosine transform is then executed by the main processor, as shown in block 418. Rate control is then performed, as shown in block 420. The main processor then performs forward quantization, as shown in block 422. A scan for zig zags is then performed, as shown in block 424. The main processor then performs inverse quantization, inverse discrete cosine transform, and adds these together, as shown in block 426. The main processor then prepares for the next macroblock, as shown in block 428. The flow of execution then continues at block 410.

With regard to the processing of co-processor 404, execution begins with waiting for data in an infinite loop, as shown in block 430. Then, depending on the mode, execution continues. As discussed above, there are three possible modes of execution in one embodiment. Mode 1, shown as reference number 432, is a bypass mode in which there is no variable length encoding preformed. The co-processor bypasses the variable length encoding block 450. As such, when Mode 1 has been selected, execution proceeds from block 430 to block 440 where the video code is written. Execution will then continue at block 460 at which time the currently processed data is written to the cache, and execution resumes at block 430. In Mode 2, shown as reference number 434, variable length encoding is achieved. Mode 2 may be considered normal mode. As such, in Mode 2, VLE block 450 is executed. That is, after block 430, when in Mode 2, the macroblock header is encoded, as shown in block 452, the motion vector is encoded, as shown in block 454, and discrete cosine transform (DCT) coefficients are encoded, as shown in block 456. Upon completion of VLE block 450, the results are written to the co-processor cache, as shown in block 460. The flow of execution then continues at block 430. Mode 3, shown as reference number 436, may be referred to as the encode slice header code on top of an encoded macroblock mode. In this mode, the co-processor encodes the slice header, as shown in block 438. Execution will then continue in the VLE block 450 and its constituent blocks as discussed above.

Figure 5:
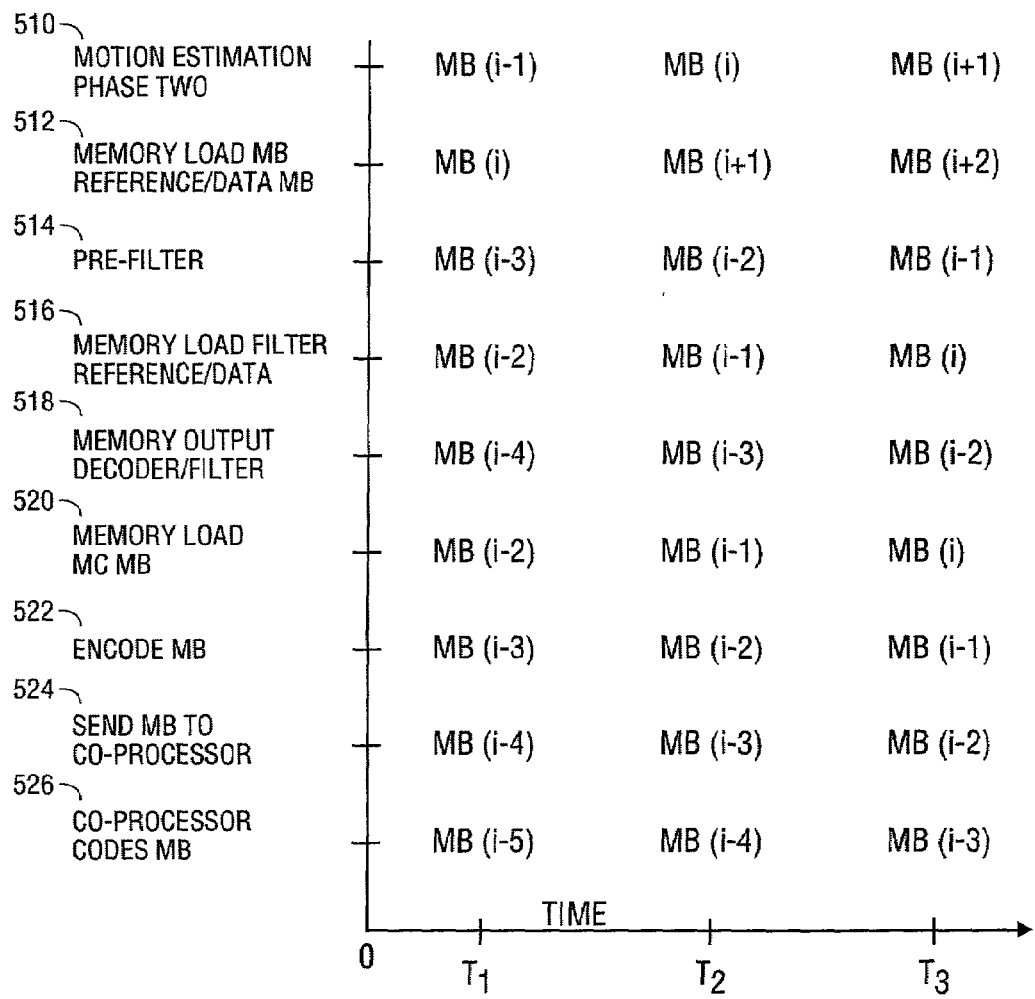
FIG. 5 illustrates the timing of tasks achieved when encoding digital video according to one embodiment of the invention described herein.

FIG. 5 illustrates the timing of tasks achieved when encoding digital video according to one embodiment of the invention described herein. When viewing the timing of each of the tasks involved in encoding digital video, it becomes apparent that the tasks may be allocated among two processors according to the methods described herein. For example, when a current macroblock referred to as MB(i), is being processed by the main processor an earlier macroblock such as MB(i−5) may be processed by a co-processor. When the current macroblock MB(i) is being loaded for motion estimation, as shown in the drawing as number 512, the prior macroblock MB(i−1) may be undergoing Phase 2 of motion estimation, shown by reference number 510. In one embodiment, the tasks involved with digital video encoding may be thought of as: motion estimation Phase 2, as shown by reference number 510; loading into memory the current macroblock and associated reference data required for motion estimation, as shown by reference number 512; prefiltering the current macroblock of the future frame, as shown by reference number 514; loading the filter reference data into memory, as shown by reference number 516; transferring the decoder/filter output to main memory, as shown by reference number 518; loading the current macroblock (MB) and the motion compensation (MC) reference block base of the motion vector resulting from motion estimation Phase 2, as shown by reference number 520; encoding the current macroblock including performing mode decision, motion compensation, forward discrete cosine transform, rate control, forward quantization, inverse quantization and inverse discrete cosine transform, as shown by reference number 522; sending the macroblock to the co-processor, as shown by reference number 524; and the co-processor coding the macroblock, as shown by reference number 526. Review of FIG. 5 shows that each of these tasks may be achieved on different macroblocks at the same time to achieve greater encoding throughput by parallel processing. For example, when at time $T_1$ a current macroblock is loaded into memory, as shown at the intersection of $T_1$ with reference number 512, the co-processor may be working on an earlier macroblock such as MB(i−5) while the main processor is performing other tasks on other macroblocks and particularly while the current macroblock MB(i) is being loaded into memory. These benefits may be seen more clearly with reference to the next drawing.

Figure 6:
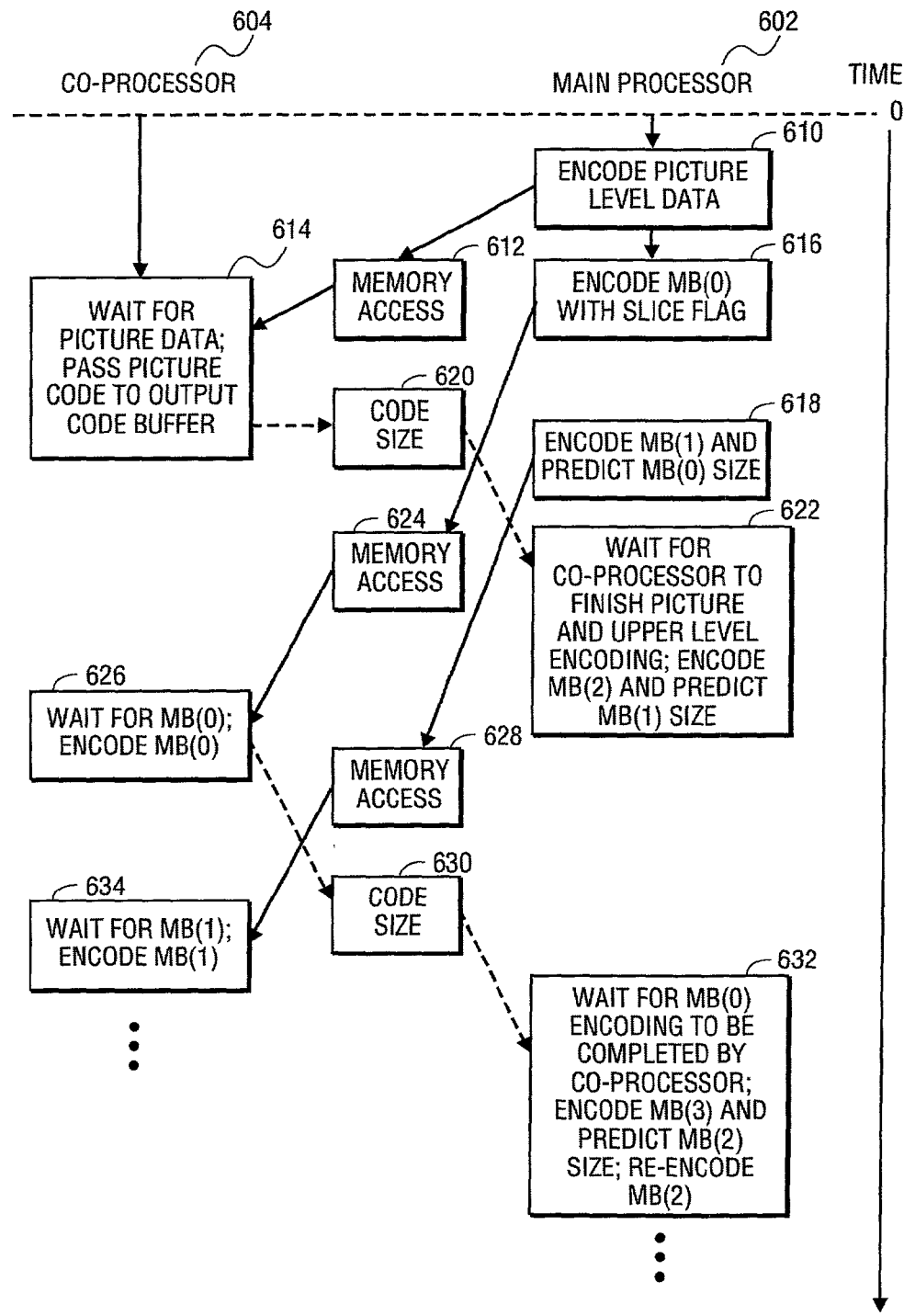
FIG. 6 illustrates the tasks involved with encoding digital video and their allocation between a main processor and a co-processor according to one embodiment of the invention described herein.

FIG. 6 illustrates the tasks involved with encoding digital video and their allocation between a main processor and a co-processor according to one embodiment of the invention described herein. Main processor 602 may encode picture level data as shown in block 610. The result of this encoding is then stored in memory via a memory access, as shown in block 612. During this main processor processing of block 610, co-processor 604 sits idle and waits for picture data to be stored in memory, as shown in block 614. The co-processor, upon receipt of the picture data from memory, passes the picture code to its output code buffer, as shown in block 614. The output of the co-processor is the code size of the picture level and upper code, as shown in block 620. While the co-processor is processing the picture code in block 614, the main processor is encoding macroblock MB(0) with a slice flag, as shown in block 616. Encoding MB(0) involves the processing described above regarding block 522 of FIG. 5. After the main processor encodes the macroblock with a slice flag, as shown in block 616, the main processor accesses memory as shown in block 624 to provide the result of the encoding to the co-processor. The co-processor waits for the result of the encoding of macroblock MB(0) with a slice flag in block 616 and then encodes macroblock MB(0), as shown in block 626. While the co-processor encodes macroblock MB(0) in block 626, the main processor encodes macroblock MB(1) and predicts the size of macroblock MB(0), as shown in block 618. After the main processor encodes macroblock MB(1) and predicts the size of macroblock MB(0), as shown in block 618, the main processor accesses memory, as shown by block 628. The co-processor waits for macroblock MB(1) from the main processor and then encodes macroblock MB(1) as shown in block 634. That is, the co-processor retrieves from memory the result of the encoding and predicting of the main processor from block 618. While the co-processor is processing or encoding macroblock MB(1), as shown in block 634, the main processor, after waiting for picture and upper level data encoding to be completed by the co-processor, then encodes macroblock MB(2) and predicts the size of macroblock MB(1), as shown in block 622. The main processor receives a code size of macroblock MB(0) from the co-processor after the encoding by the co-processor achieved in block 626. If the bit count of macroblock MB(0) returned by co-processor is over the MPEG-2 standard imposed size limitation, such as, for example 4,608 bits, the main processor will set the quantization step size to a maximum value for the whole row to guarantee that there will be no additional oversized blocks. Then, the main processor re-encodes MB(2) before sending it to the co-processor and encodes macroblock MB(3), as shown in block 632. As a result, both macroblock MB(0) and macroblock MB(1) may be bigger than 4,608 bits. Because the MPEG-2 standard allows at most two big macroblocks per horizontal row, the generated video code adheres to the MPEG-2 video stream standard. The co-processor also writes the bit count into the main processor's local cache. In one embodiment, this is done directly. All other data transfers are achieved via the DMA controller. Parallel processing on the main processor and co-processor then continues in a similar fashion until encoding is completed.

Figure 7:
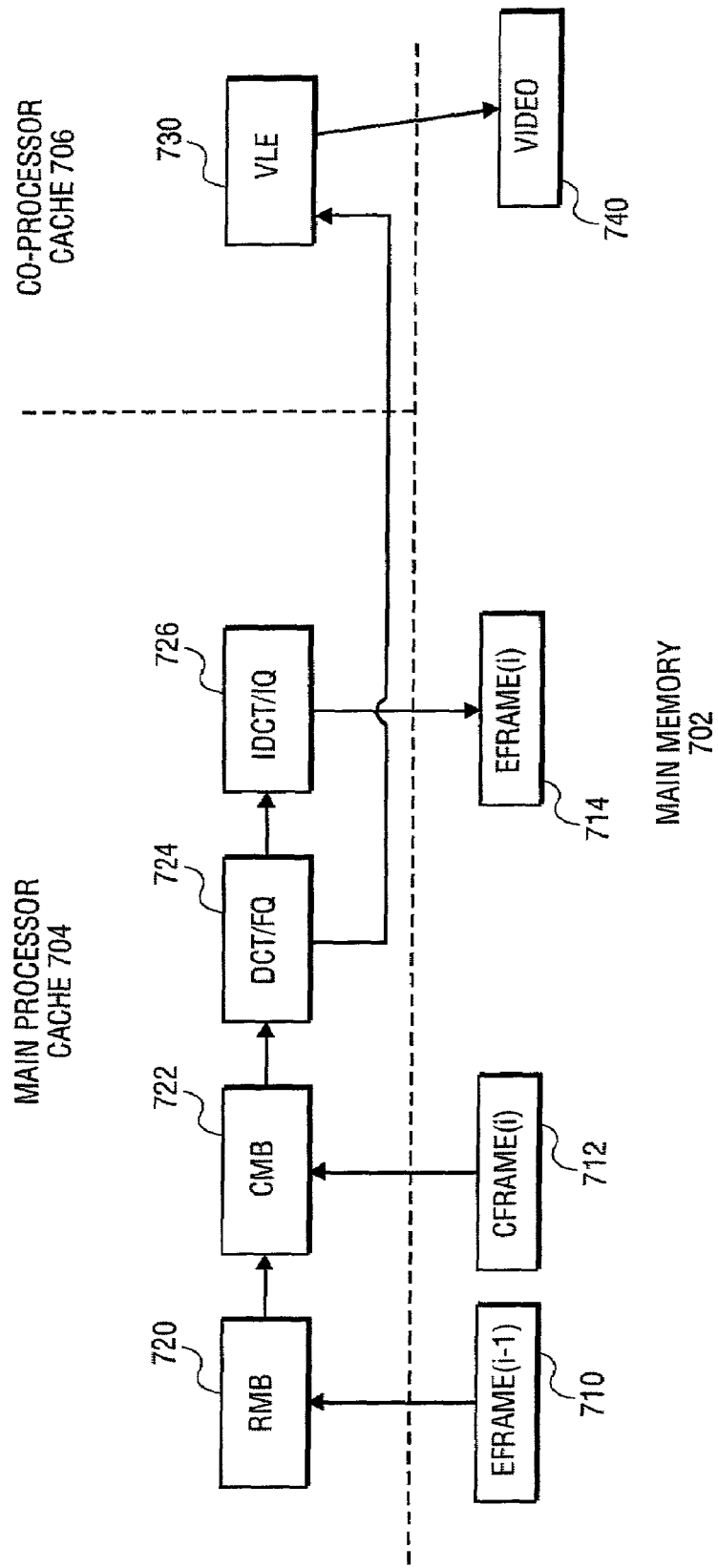
FIG. 7 illustrates a conceptual diagram of what data is stored in various memory locations during video encoding processing according to an embodiment of the systems and methods described herein.

FIG. 7 illustrates a conceptual diagram of what data is stored in various memory locations during video encoding processing according to an embodiment of the systems and methods described herein. The main processor may include main processor cache 704, and the co-processor may include co-processor cache 706. Main memory 702 is also used during the digital video encoding described herein. In one embodiment, an encoded frame is stored in main memory as EFRAME (i−1) 710. The encoded frame is retrieved by the main processor and stored in main processor cache 704 after processing as reference macroblock (RMB) 720. After some processing, the main processor creates a current macroblock and also retrieves data from main memory 702 in the form of a current frame CFRAME(i) 712. Current macroblock (CMB) 722 is then processed and the resulting data is passed to the discrete cosine transform/forward quantization step, as shown in block 724. Results of the discrete cosine transform/forward quantization step are passed to the inverse discrete cosine transform/inverse quantization (IDCT/IQ) step, as shown in block 726. In addition, the results of the discrete cosine transform/forward quantization (DCT/FQ) step shown in block 724 are also passed from the main processor cache 704 to the co-processor cache 706. The co-processor then performs a variable length encoding at block 730 to produce video code 740. While working on processing variable length encoding (VLE), as shown by block 730, the co-processor stores data in co-processor cache 706. This is the same VLE referred to in blocks 350 and 450 discussed above regarding FIG. 3 and FIG. 4, respectively. Upon completion of this processing, the video code is then written to main memory, as shown in block 740. Going back to block 726, upon completion of the inverse discrete cosine transform, the main processor writes the results into main memory 702 as encoded frame EFRAME (i), as shown in block 714.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
    an interface coupled to a bus to receive a real time video stream to be encoded using a parallel macroblock loop comprising a first and second group of video encoding tasks, wherein the first group of video encoding tasks comprises video encoding tasks not including variable length encoding tasks and the second group of video encoding tasks comprises variable length encoding tasks;
    a main processor coupled to the bus, the main processor to execute the first group of video encoding tasks on a macroblock;
    a co-processor coupled to the bus, the co-processor to execute the second group of video encoding tasks on a macroblock previously processed by the main processor, wherein the first group of video encoding tasks is executed substantially concurrently with the execution of the second group of video encoding tasks.

2. The system of claim 1 wherein the first group of video encoding tasks and the second group of video encoding tasks comprise those tasks required of at least one of the Moving Pictures Expert Group (MPEG) standards for video encoding.

3. The system of claim 1 wherein:
    the first group of video encoding tasks comprises at least motion estimation, pre-processing, mode selection, forward discrete cosine transform computation, forward quantization computation, rate control, zig zag scanning, inverse discrete cosine transform computation, inverse quantization computation, and motion compensation; and
    the second group of video encoding tasks comprises variable length encoding computation.

4. The system of claim 3 wherein the variable length encoding computation comprises:
    macroblock header encoding;
    motion vector encoding; and
    discrete cosine transform coefficients encoding.

5. The system of claim 3 wherein the motion estimation comprises:
    a first phase includes top to top searching and bottom to bottom searching; and
    a second phase includes top to bottom searching and bottom to top searching.

6. The system of claim 3 wherein the pre-processor is a variable length encoder/decoder co-processor.

7. The system of claim 1 wherein the co-processor is a variable length encoder/decoder co-processor.

8. The system of claim 1 wherein the interface is at least one of a broadcast interface and a network interface.

9. The system of claim 1 further comprising:
    an audio output interface; and
    a video output interface.

10. The system of claim 1 wherein the real time video stream is at least one of a television signal received wirelessly and a television stream received via a hardwired connection.

11. A system comprising:
    a main processor coupled to a bus;
    a co-processor coupled to the bus;
    a main memory coupled to the bus;
    an interface coupled to the bus to receive a real time video stream to be encoded using a parallel macroblock loop comprising a first and second group of video encoding tasks, wherein the first group of video encoding tasks comprises video encoding tasks not including variable length encoding tasks and the second group of video encoding tasks comprises variable length encoding tasks; and
    a video encoding process executed from the main memory by the main processor to cause the main processor to allocate the first group of video encoding tasks to the main processor and allocate to the co-processor the second group of video encoding tasks, wherein the main processor executes the first group of video encoding tasks on a macroblock substantially concurrently with the co-processor executing the second group of video tasks on a macroblock previously processed by the main processor.

12. The system of claim 11 wherein the well known standard is at least one of the Moving Pictures Expert Group (MPEG) standards for video encoding.

13. The system of claim 11 wherein the encoding tasks comprises at least motion estimation, pre-processing, mode selection, forward discrete cosine transform computation, forward quantization computation, rate control, zig zag scanning, inverse discrete cosine transform computation, inverse quantization, and motion compensation; and
the second group of video encoding tasks comprises variable length encoding computation.

14. The system of claim 13 wherein the variable length encoding computation comprises:
macroblock header encoding;
motion vector encoding; and
discrete cosine transform coefficients encoding.

15. The system of claim 13 wherein the motion estimation comprises:
a first phase includes top to top searching and bottom to bottom searching; and
a second phase includes top to bottom searching and bottom to top searching.

16. The system of claim 13 wherein the pre-processing comprises:
noise reduction.

17. The system of claim 11 wherein the co-processor is a variable length encoder/decoder co-processor.

18. The system of claim 11 wherein the interface is at least one of a broadcast interface and a network interface.

19. The system of claim 11 further comprising:
an audio output interface; and
a video output interface.

20. The system of claim 11 wherein the real time video stream is at least one of a television signal received wirelessly and a television stream received via a hardwired connection.

21. A method for video encoding comprising:
receiving a real time video stream to be encoded using a parallel macroblock loop comprising a first and second group of video encoding tasks, wherein the first group of video encoding tasks comprises video encoding tasks not including variable length encoding tasks and the second group of video encoding tasks comprises variable length encoding tasks;
performing picture level and upper processing on a main processor;
executing a macroblock loop in parallel on the main processor and a co-processor, wherein the main processor executes the first group of video encoding tasks on a macroblock substantially concurrently with the co-processor executing the second group of video encoding tasks on a macroblock previously processed by the main processor; and
outputting an encoded version of the real time video stream.

22. The method of claim 21 wherein the co-processor is a variable length encoded/decoder co-processor.

23. The method of claim 21 wherein the real time video stream is at least one of a television signal received wirelessly and a television stream received via a hardwired connection.

24. The method of claim 21 wherein the video encoding is performed according to at least one of the Moving Pictures Expert Group (MPEG) standards for video encoding.

25. The method of claim 21 wherein:
the first group of video encoding tasks comprises at least motion estimation, pre-processing, mode selection, forward discrete cosine transform computation, forward quantization computation, rate control, zig zag scanning, inverse discrete cosine transform computation, inverse quantization computation, and motion compensation; and
the second group of video encoding tasks comprises variable length encoding computation.

26. The method of claim 25 wherein the variable length encoding computation comprises:
macroblock header encoding;
motion vector encoding; and
discrete cosine transform coefficients encoding.

27. The method of claim 25 wherein the motion estimation comprises:
a first phase that includes top to top searching and bottom to bottom searching; and
a second phase that includes top to bottom searching and bottom to top searching.

28. The method of claim 25 wherein the pre-processing comprises:
noise reduction.

29. A machine readable medium having instructions stored thereon which when executed by a main processor cause the main processor perform operations to encode a real time video stream according to a well known standard, the operations comprising:
allocating a first group of video encoding tasks comprising those video tasks not included in the variable length encoding to the main processor;
allocating a second group of video encoding tasks comprising variable length encoding tasks involved with encoding the real time video stream to the co-processor; and
encoding the real time video stream using a macroblock loop executed in parallel, wherein the first group of video encoding tasks is executed on a macroblock by the main processor substantially concurrently with the second group of video encoding tasks being executed on a macroblock previously processed by the main processor by the co-processor.

30. The machine readable medium of claim 29 wherein the co-processor is a variable length encoded/decoder co-processor.

31. The machine readable medium of claim 29 wherein the real time video stream is at least one of a television signal received wirelessly and a television stream received via a hardwired connection.

32. The method readable medium of claim 29 wherein the first group of video encoding tasks and the second group of video encoding tasks comprise those tasks required of at least one of the Moving Pictures Expert Group (MPEG) standards for video encoding.

33. The machine readable medium of claim 29 wherein:
the first group of video encoding tasks comprises at least motion estimation, pre-processing, mode selection, forward discrete cosine transform computation, forward quantization computation, rate control, zig zag scanning, inverse discrete cosine transform computation, inverse quantization computation, and motion compensation; and
the second group of video encoding tasks comprises variable length encoding computation.

34. The machine readable medium of claim 33 wherein the variable length encoding computation comprises:

macroblock header encoding;
motion vector encoding; and
discrete cosine transform coefficient encoding.

35. The machine readable medium of claim 33 wherein the motion estimation comprises:
  a first phase that includes top to top searching and bottom to bottom searching; and
  a second phase that includes top to bottom searching and bottom to top searching.

36. The machine readable medium of claim 33 wherein the pre-processing comprises:
  noise reduction.

* * * * *